US012805431B2

(12) United States Patent
Zhu et al.

(10) Patent No.: US 12,805,431 B2
(45) Date of Patent: Nov. 24, 2026

(54) TRIMMER HEAD

(71) Applicant: Greenworks (Jiangsu) Co., Ltd, Changzhou (CN)

(72) Inventors: Binghui Zhu, Changzhou (CN); Doushi Wang, Changzhou (CN)

(73) Assignee: Greenworks (Jiangsu) Co., Ltd, Changzhou (CN)

(*) Notice: Subject to any disclaimer, the term of this patent is extended or adjusted under 35 U.S.C. 154(b) by 139 days.

(21) Appl. No.: 19/001,668

(22) Filed: Dec. 26, 2024

(65) Prior Publication Data

US 2025/0212720 A1 Jul. 3, 2025

(30) Foreign Application Priority Data

Dec. 27, 2023 (CN) ......................... 202323598910.8

(51) Int. Cl.
*A01D 34/416* (2006.01)
*A01D 34/82* (2006.01)

(52) U.S. Cl.
CPC ......... *A01D 34/4161* (2013.01); *A01D 34/82* (2013.01)

(58) Field of Classification Search
CPC ... A01D 34/82; A01D 34/416; A01D 34/4162
See application file for complete search history.

(56) References Cited

U.S. PATENT DOCUMENTS 4,290,200 A * 9/1981 Lombard ........... A01D 34/4162 30/276
4,366,622 A * 1/1983 Lombard ........... A01D 34/4162 30/276
5,657,542 A * 8/1997 White, III ............ A01D 34/416 30/276
6,052,974 A * 4/2000 Harb .................... A01D 34/416 30/329
11,089,725 B2 * 8/2021 Nie .................... A01D 34/4163
2001/0023542 A1 * 9/2001 Brant ................... A01D 34/416 30/276
2002/0035788 A1 * 3/2002 Wilson ............... A01D 34/4162 30/277.4
2015/0223395 A1 * 8/2015 Pellenc .............. A01D 34/4166 30/276
2015/0245558 A1 * 9/2015 Morabit ............. A01D 34/4165 29/401.1
2015/0342116 A1 * 12/2015 Sprungman ........ A01D 34/4166 30/276
2019/0350131 A1 * 11/2019 Shin ..................... A01D 34/416
(Continued)

*Primary Examiner* — Sean M Michalski

(57) ABSTRACT

A trimmer head includes a housing, a string reel and a control assembly. The housing is provided with passing holes communicated mutually and an assembly cavity for accommodating the string reel. The control assembly is clamped with the string reel and can control the string reel to rotate. The control assembly includes a driving component, a driven component and an elastic component. The driving component includes a pressing part, an extruding part, and a pushing part. When the pressing part is pressed, the pushing part pushes the driven component to detach from the string reel, the elastic component is squeezed, and the string reel rotates to release a wire. When the pressing part is released, the driving/driven components are reset under an action of the elastic component. A sealing ring is clamped between the housing and the extruding part.

13 Claims, 5 Drawing Sheets

(56) References Cited

U.S. PATENT DOCUMENTS

| | | | | |
|---|---|---|---|---|
| 2020/0315089 | A1* | 10/2020 | Racz | A01D 34/416 |
| 2021/0137004 | A1* | 5/2021 | Nie | A01D 34/416 |
| 2021/0321560 | A1* | 10/2021 | Dai | A01D 34/4162 |
| 2023/0112033 | A1* | 4/2023 | Guo | A01D 34/4166<br>30/276 |
| 2023/0157205 | A1* | 5/2023 | Kullberg | A01D 34/4162<br>30/276 |

* cited by examiner

TRIMMER HEAD

CROSS REFERENCE TO RELATED APPLICATION

The present application claims the priority of the following Chinese patent applications: serial No. CN 202323598910.8, filed on Dec. 27, 2023; the disclosure of which is hereby incorporated by reference herein in its entirety for all purposes.

TECHNICAL FIELD

The disclosure provides a trimmer head, and belongs to a field of garden tools.

BACKGROUND

At present, the gap between the wire-releasing button and the fan blade of the common self-releasing trimmer heads on the market is very large. Lawn clippings and dust may easily enter the trimmer head through the gap. On the one hand, it may cause the wire-releasing function of the trimmer head to fail, and on the other hand, it is difficult to clean.

In view of this, it is necessary to improve the conventional trimmer head to solve the problems mentioned above.

SUMMARY

The disclosure provides a trimmer head. The trimmer head can prevent lawn clippings, dust and the like from entering an interior of the trimmer head.

One of more embodiments of the disclosure provides the trimmer head, and the trimmer head includes a housing, a string reel and a control assembly.

The housing is provided with a passing hole communicated mutually and an assembly cavity.

The string reel is accommodated in the assembly cavity.

The control assembly is clamped with the string reel and configured to control the string reel to rotate. The control assembly includes a driving component, a driven component and an elastic component. The driving component includes a pressing part passing through the passing hole and exposed to an outer side of the housing, an extruding part abutting against an inner wall surface of the housing, and a pushing part pushing the driven component, the driven component and the string reel clamped with each other, when the pressing part is pressed, the pushing part pushing the driven component to move so as to enable the driven component to detach from the string reel, the elastic component being squeezed, the string reel rotating to release a wire, and when the pressing part is released, the driving component and the driven component being reset under an action of the elastic component.

A sealing ring is sleeved on an outer wall surface of the pressing part and clamped between the housing and the extruding part, and when the trimmer head is running, the extruding part is configured to abut against the inner wall surface of the housing under an action of a centrifugal force and squeeze the sealing ring in different directions with the housing.

In one or more embodiments, a positioning groove is arranged at one end of the driven component away from the driving component, a first end of the elastic component is fixed in the positioning groove, a second end of the elastic component is configured to abut against the housing, and the elastic component is capable of being elastically deformed along with a movement of the driven component.

In one or more embodiments, a center of gravity of the driven component is configured to be at one end away from the driving component, when the trimmer head is running, the driven component is configured to slide toward a side away from the driving component under the action of centrifugal force and squeeze the elastic component to disengage from the string reel, then the string reel is rotated to release the wire, and when the centrifugal force weakens, the driven component is capable of being reset under the elastic action of the elastic component.

In one or more embodiments, a pushing groove is further formed at one end of the driven component facing the driving component, the pushing part is accommodated in the pushing groove, and a length of the pushing groove is greater than a length of the pushing part.

In one or more embodiments, the pushing part includes a U-shaped pushing plate and a pushing post fixed in the pushing plate, the pushing plate is accommodated in the pushing groove.

In one or more embodiments, the control assembly further includes a reset spring, a first end of the reset spring is sleeved on the pushing post, and a second end of the reset spring abuts against the housing.

In one or more embodiments, a sliding groove is arranged on the inner wall surface of the housing, the pushing post is partially accommodated in the sliding groove, and when the pressing part is pressed, the pushing plate and the pushing post are capable of pushing the driven component to move along the pushing groove and the sliding groove respectively.

In one or more embodiments, a mounting groove is arranged at a center of the string reel, a through hole is arranged on the driven component, a positioning post protruding toward the string reel is arranged inside the housing, the positioning post passes through the through hole and is fixedly accommodated in the mounting groove, the pushing post is configured to extend toward the positioning post, the first end of the reset spring is sleeved on the pushing post, and the second end of the reset spring abuts against the positioning post.

In one or more embodiments, the housing includes a first housing and a second housing assembled with each other, the assembly cavity is enclosed with the first housing and the second housing, a limiting groove is arranged on a side of the first housing facing the second housing, the passing hole is opened on the first housing and communicated with the limiting groove, and the control assembly is movably accommodated in the limiting groove.

In one or more embodiments, clamping arms are respectively arranged on two opposite inner side walls of the limiting groove, extending parts are arranged on two sides of the driven component, each of the extending part is limitedly accommodated between the corresponding clamping arm and an inner wall surface of the first housing to fix the control assembly in the limiting groove.

In one or more embodiments, a supporting deck is arranged on a side of the string reel facing the first housing, a first positioning ratchet gear integrally formed with the string reel and a second positioning ratchet gear concentrically arranged on a circumferential outside of the first positioning ratchet gear are arranged in the supporting deck, the driven component is provided with a first block and a second block protruding toward the string reel, and both the first block and the second block are capable of being meshed with the first positioning ratchet gear and the second positioning ratchet gear.

In one or more embodiments, the first block and the second block are oppositely arranged on the two sides of the driven component, the first block is closer to the driving component than the second, in an initial state, the first block and the second positioning ratchet gear are clamped with each other, the second block and the first positioning ratchet gear are clamped with each other to limit the string reel to rotate, when the driving component is pressed, the driven component moves, the first block disengages from the second positioning ratchet gear until the first block is clamped with the first positioning ratchet gear, and the second block disengages from the first positioning ratchet gear until the second block is clamped with the second positioning ratchet gear.

In one or more embodiments, the housing is further provided with a string outlet, and the string outlet is arranged at an oblique angle to the string reel.

Beneficial effects of one or more embodiments of the disclosure are as follows: the trimmer head may prevent lawn clippings, dust, etc. from entering an interior of the trimmer head by configuring the control assembly into the driving component and the driven component that are linked to each other, and arranging the sealing ring between the extruding part of the driving component and the inner wall surface of the housing, thereby improving user experience.

DETAILED DESCRIPTION

In order to enable the purpose, technical solutions and advantages of the disclosure to be clearer, the disclosure is described in detail below references to the accompanying drawings and specific embodiments.

Figure 1:
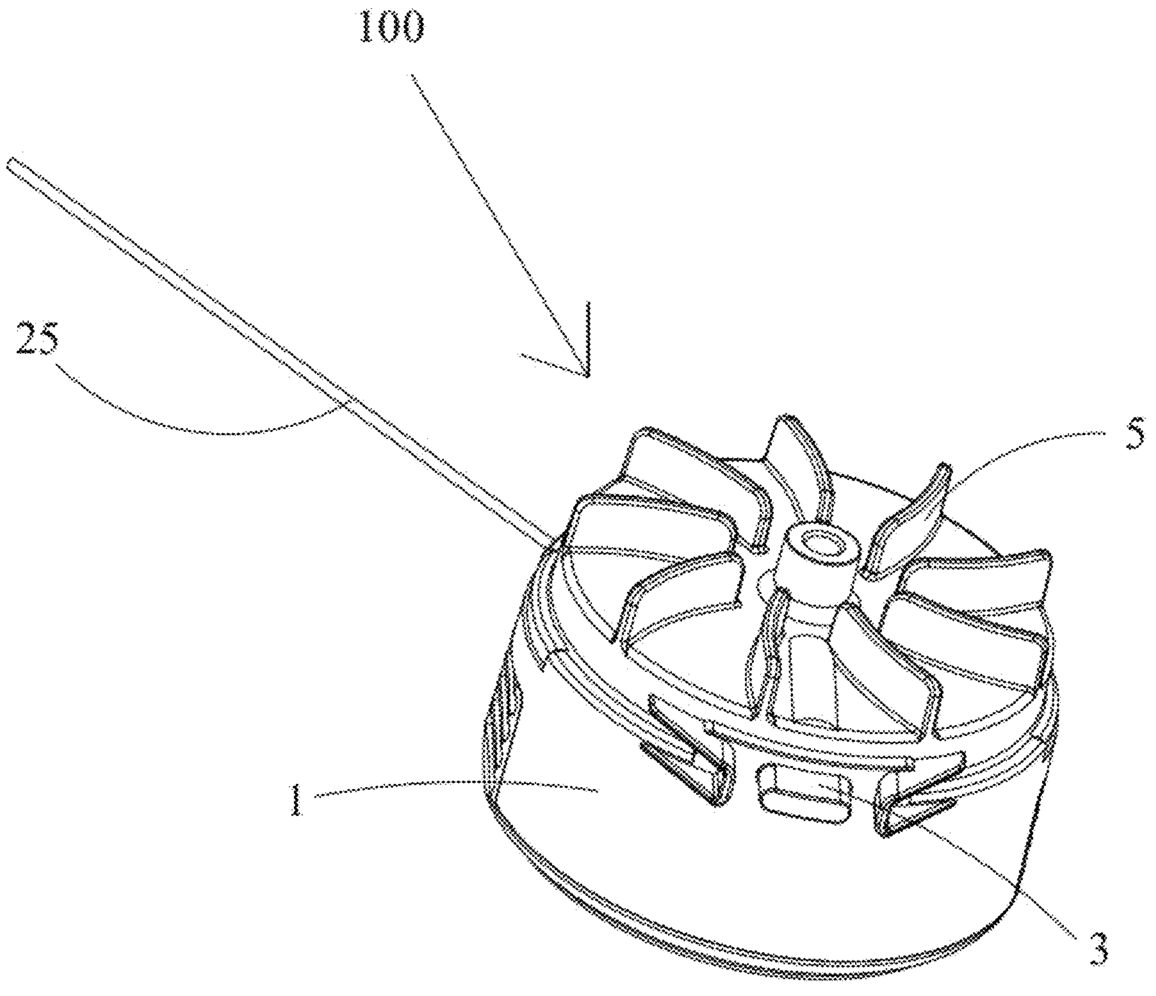
FIG. 1 is a schematic structural view of a trimmer head according to at least one embodiment of the disclosure.
Figure 2:
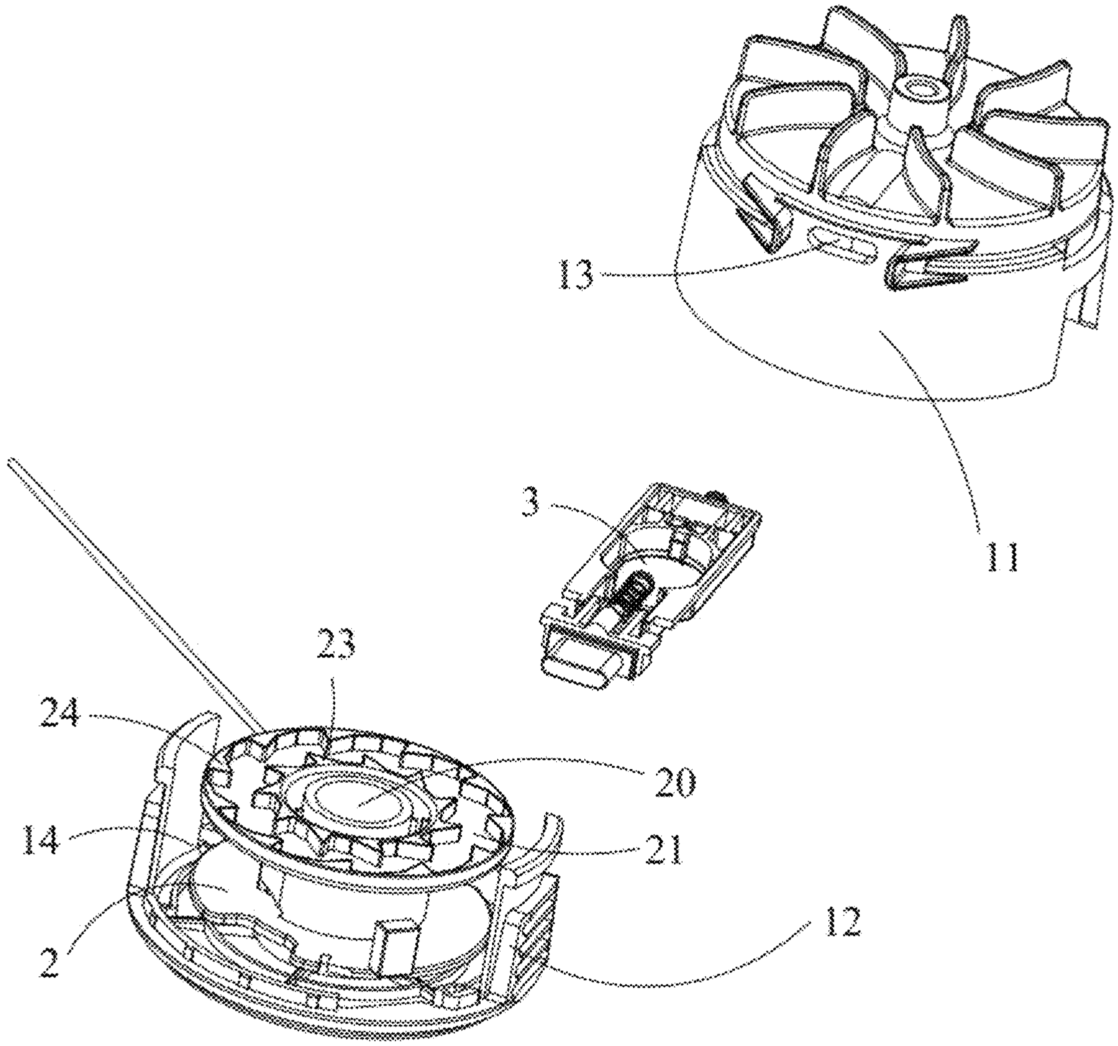
FIG. 2 is an exploded view of the trimmer head in FIG. 1.
Figure 3:
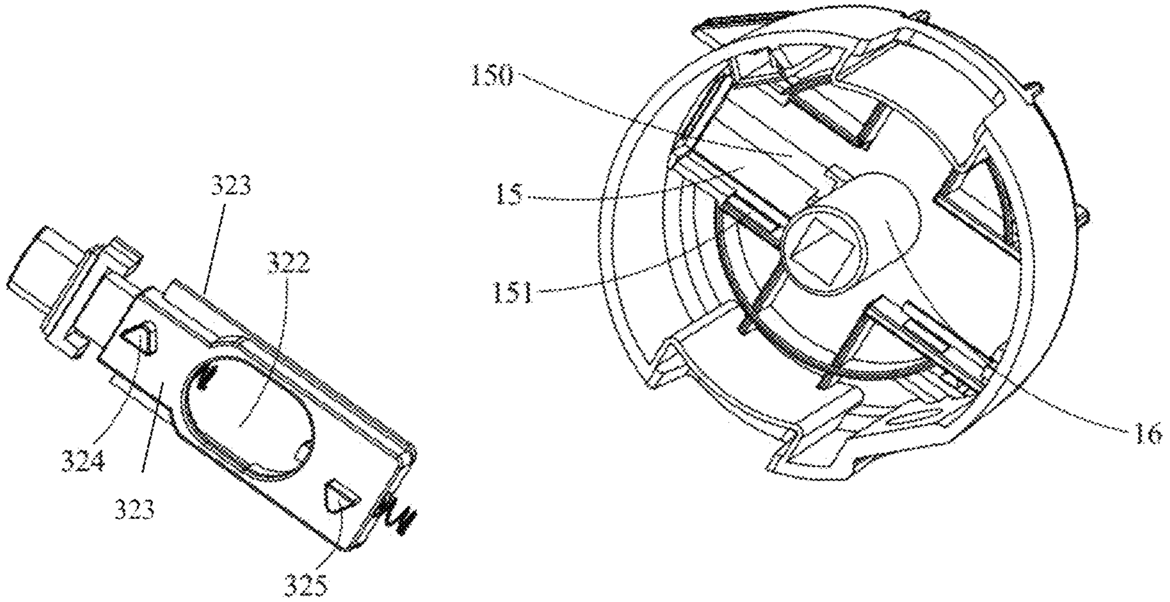
FIG. 3 is a schematic structural view of a first housing and a control assembly in FIG. 2 from another angle.
Figure 4:
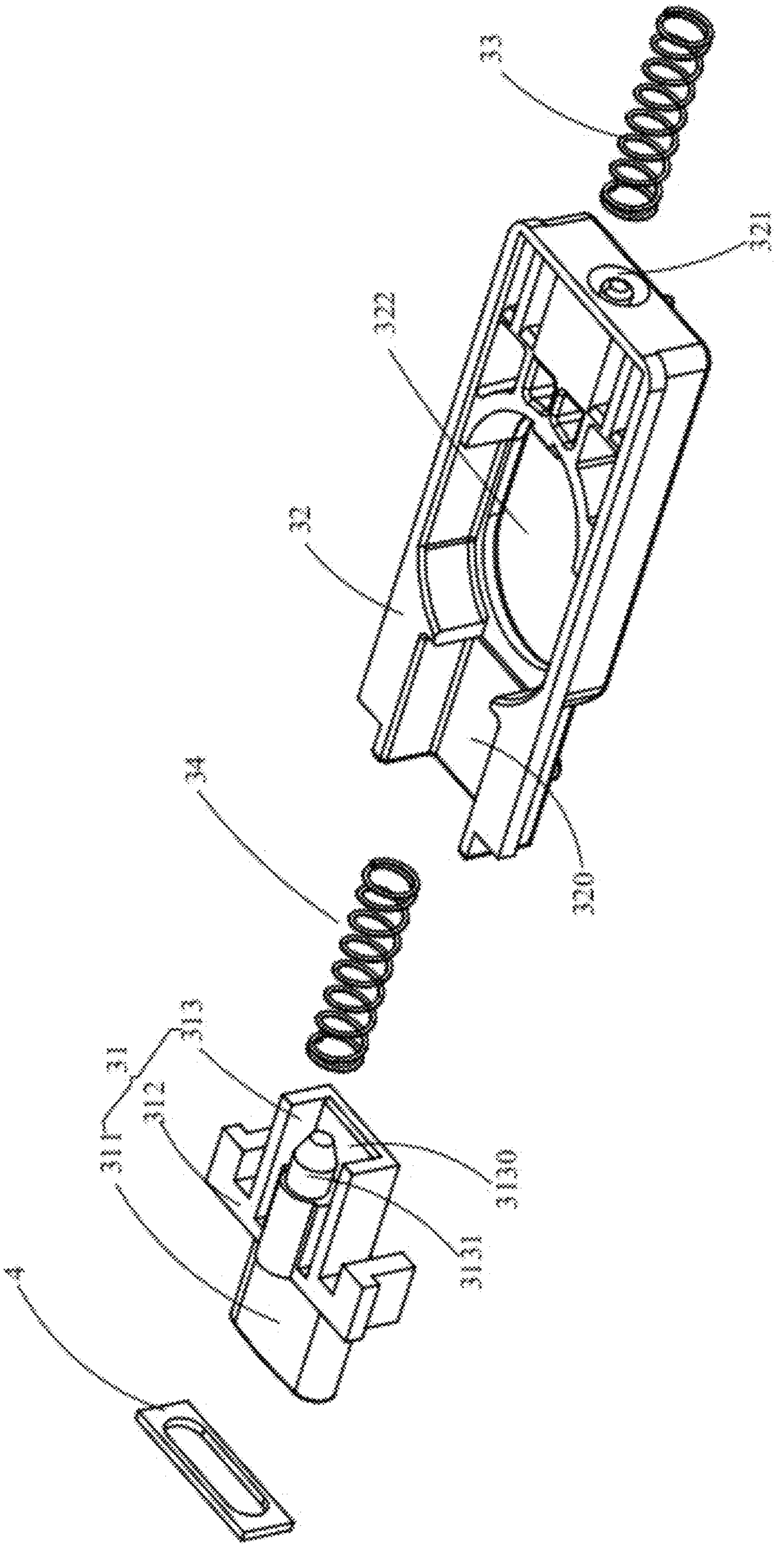
FIG. 4 is an exploded view of the control assembly in FIG. 2.
Figure 5:
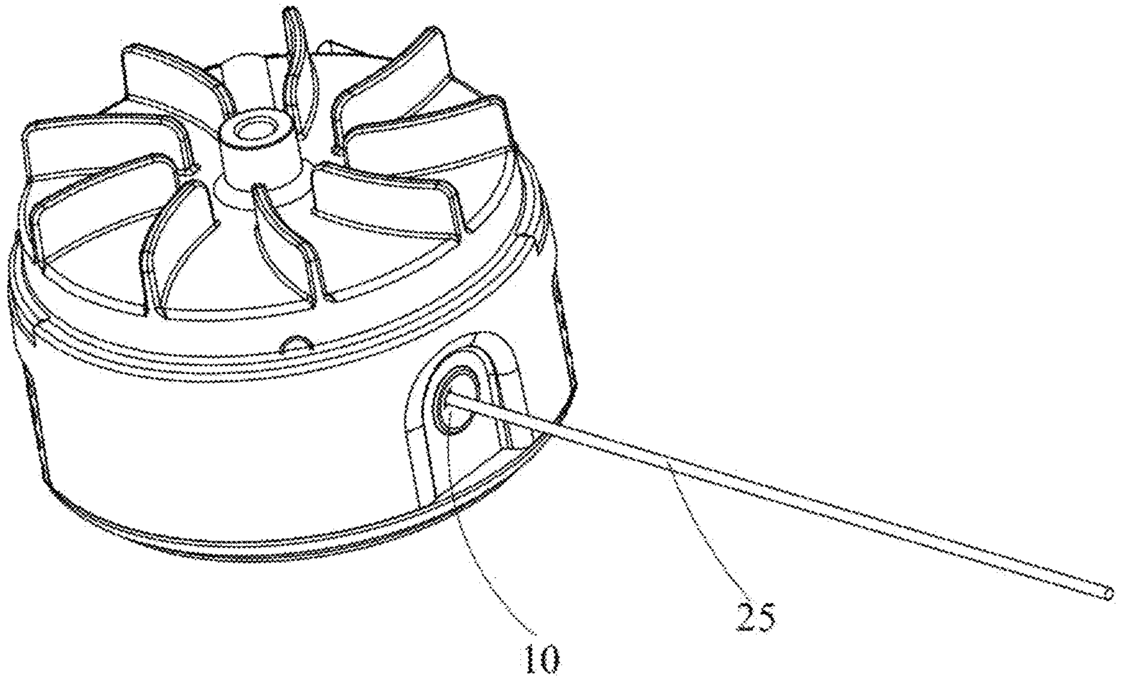
FIG. 5 is a schematic structural view of the trimmer head in FIG. 1 from another angle.

Please refer to FIG. 1 through FIG. 5. The disclosure provides a trimmer head 100. The trimmer head 100 includes a housing 1 and a string reel 2 accommodated in the housing 1. A string outlet 10 is arranged on the housing 1, and a wire 25 on the string reel 2 is released from the string outlet 10 to mow lawn clippings. In some embodiments, the string outlet 10 is arranged at an oblique angle to the string reel 2. Experiments have shown that, compared with an original string outlet 10 directly facing the string reel 2, the oblique string outlet 10 in this embodiment can enable the string outlet to be smoother.

The housing 1 includes a first housing 11 and a second housing 12 which are assembled with each other. The first housing 11 and the second housing 12 are jointly arranged to form a passing hole 13 and an assembly cavity 14 which are communicated with each other. The string reel 2 is assembled in the assembly cavity 14 and fixedly connected with the second housing 12. A limiting groove 15 is arranged on one side of the first housing 11 facing the second housing 12, and the passing hole 13 is formed on the first housing 11 and communicated with the limiting groove 15.

The trimmer head 100 further includes a control assembly 3 which is clamped with the string reel 2 and can control the string reel 2 to rotate. The control assembly 3 is movably accommodated in the limiting groove 15. The control assembly 3 includes a driving component 31, a driven component 32 and an clastic component 33, the driving component 31 includes a pressing part 311 passing through the passing hole 13 and exposed to an outer side of the housing 1, an extruding part 312 abutting against an inner wall surface of the housing 1, and a pushing part 313 pushing the driven component 32. The driven component 32 and the string reel 2 are clamped with each other. When the pressing part 311 is pressed, the pushing part 313 pushes the driven component 32 to move so as to enable the driven component 32 to detach from the string reel 2. The elastic component 33 is squeezed, and the string reel 2 rotates to release a wire. When the pressing part 311 is released, the driving component 31 and the driven component 32 are reset under an action of the clastic component 33. In this way, when necessary, the string reel 2 may release the wire by pressing the driving component 31, thereby improving a usability.

In this embodiment, clamping arms 151 are respectively arranged on two opposite inner side walls of the limiting groove 15, extending parts 323 are correspondingly arranged on two sides of the driven component 32, the extending part 323 is limitedly accommodated between the corresponding clamping arm 151 and an inner wall surface of the first housing 11 to fix the control assembly 3 in the limiting groove 15.

A positioning groove 321 is arranged at one end of the driven component 32 away from the driving component 31, a first end of the clastic component 33 is fixed in the positioning groove 321, a second end of the elastic component 33 abuts against the housing 1, and the elastic component 33 is capable of being elastically deformed along with a movement of the driven component 32. That is to say, the driven component 32 drives the driving component 31 to reset together through the elastic component 33.

A pushing groove 320 is further formed at one end of the driven component 32 facing the driving component 31, the pushing part 313 is accommodated in the pushing groove 320, and a length of the pushing groove 320 is greater than a length of the pushing part 313, so that the pushing part 313 always remains partially inside the pushing groove 320.

In an embodiment, the pushing part 313 includes a U-shaped pushing plate 3130 and a pushing post 3131 fixed in the pushing plate 3130, the pushing plate 3130 is accommodated in the pushing groove 320, the control assembly 3 further includes a reset spring 34, a first end of the reset spring 34 is sleeved on the pushing post 3131, and a second end of the reset spring 34 abuts against the housing 1. That is to say, the driving component 31 and the driven component 32 are both provided with independent resetting devices, and the driving component 31 may be reset independently without relying on the driven component 32.

In some embodiments, a sliding groove 150 is arranged on the inner wall surface of the housing 1, the pushing post 3131 is partially accommodated in the sliding groove 150, and when the pressing part 311 is pressed, the pushing plate 3130 and the pushing post 3131 are capable of pushing the driven component 32 to move along the pushing groove 320 and the sliding groove 150 respectively. That is to say, the pushing post 3131 is accommodated by the sliding groove 150, and a moving direction of the pushing post 3131 is also limited.

A mounting groove 20 is arranged at a center of the string reel 2, a through hole 322 is correspondingly arranged on the driven component 32, and a positioning post 16 protruding toward the string reel 2 is correspondingly arranged inside the housing 1. The positioning post 16 passes through the through hole 322 and is fixedly accommodated in the mounting groove 20, and the pushing post 3131 extends toward the positioning post 16. The first end of the reset spring 34 is sleeved on the pushing post 3131, and the second end of the reset spring 34 abuts against the positioning post 16.

A supporting deck 21 is arranged on a side of the string reel 2 facing the first housing 11, and a first positioning ratchet gear 23 integrally formed with the string reel 2 and a second positioning ratchet gear 24 concentrically arranged on a circumferential outside of the first positioning ratchet gear 23 are arranged in the supporting deck 21. The driven component 32 is provided with a first block 324 and a second block 325 protruding toward the string reel 2, and both the first block 324 and the second block 325 are capable of being meshed with the first positioning ratchet gear 23 and the second positioning ratchet gear 24.

The first block 324 and the second block 325 are relatively arranged on the two sides of the driven component 32, the first block 324 is close to the driving component 31, and the second block 325 is away from the driving component 31. In an initial state, the first block 324 and the second positioning ratchet gear 24 are clamped with each other, and the second block 325 and the first positioning ratchet gear 23 are clamped with each other to limit the string reel 2 to rotate. When the driving component 31 is pressed, the driven component 32 moves, the first block 324 disengages from the second positioning ratchet gear 24 until the first block 324 is clamped with the first positioning ratchet gear 23, and the second block 325 disengages from the first positioning ratchet gear 23 until the second block 325 is clamped with the second positioning ratchet gear 24. That is to say, each pressing process is a process of replacing clamped gears of the first block 324 and the second block 325. When the first block 324 and the second block 325 are not clamped with the first positioning ratchet gear 23 or the second positioning ratchet gear 24, the string reel 2 rotates to release the wire.

It should be noted that, because the driving component 31 and the driven component 32 are both in a slidable state, when the trimmer head 100 rotates, the riving component 31 and the driven component 32 will offset toward a center of gravity under the action of centrifugal force. Therefore, in this embodiment, the center of gravity of the driving component 31 is set at one end of the driving component 31 close to the passing hole 13. When the trimmer head 100 rotates, the driving component 31 squeezes the inner wall surface of the housing 1.

In some embodiments, a sealing ring 4 is sleeved on an outer wall surface of the pressing part 311 and clamped between the housing 1 and the extruding part 312, and when the trimmer head 100 is running, the extruding part 312 abuts against the inner wall surface of the housing 1 under an action of a centrifugal force and squeezes the scaling ring 4 with the housing in different directions. In this way, through arranging the sealing ring 4, lawn clippings, dust, etc. are prevented from entering an interior of the trimmer head 100 through the passing hole 13 to affect the user's experience.

At the same time, a center of gravity of the driven component 32 is configured to be at one end away from the driving component 31, when the trimmer head 100 is running, the driven component 32 slides toward a side away from the driving component 31 under the action of centrifugal force and squeezes the clastic component 33 to disengage from the string reel 2, the string reel 2 rotates and release the wire, and when the centrifugal force weakens, the driven component 32 is capable of being reset under the clastic action of the clastic component 33. That is to say, under normal conditions, automatic wire release may be achieved without pressing the driving component 31. Of course, the automatic wire release technology is a common technical means in this field and will not be elaborated here.

A fan blade 5 is arranged on a side of the first housing 11 facing away from the second housing 12. The fan blade 5 is integrally formed with the first housing 11 and rotates synchronously with the trimmer head 100. When assembled with a motor (not shown), the fan blade 5 is directly opposite to the motor to dissipate heat from the motor.

In summary, the trimmer head 100 of the disclosure may prevent lawn clippings, dust, etc. from entering an interior of the trimmer head 100 by configuring the control assembly 3 into the driving component 31 and the driven component 32 that are linked to each other, and arranging the scaling ring 4 between the extruding part 312 of the driving component 31 and the inner wall surface of the housing 1, thereby improving user experience.

The above embodiments are only used to illustrate the technical solution of the disclosure and are not intended to limit it. Although the disclosure has been described in detail with reference to the preferred embodiments, a person skilled in the art should understand that the technical solution of the disclosure may be modified or replaced by equivalents without departing from the scope of the technical solution of the disclosure.

What is claimed is:

1. A trimmer head, comprising:

a housing, the housing provided with a passing hole communicated mutually and an assembly cavity;

a string reel, the string reel accommodated in the assembly cavity; and a control assembly, clamped with the string reel and configured to control the string reel to rotate, the control assembly comprising a driving component, a driven component and an elastic component, the driving component comprising a pressing part passing through the passing hole and exposed to an outer side of the housing, an extruding part abutting against an inner wall surface of the housing, and a pushing part pushing the driven component, the driven component and the string reel clamped with each other, when the pressing part is pressed, the pushing part pushing the driven component to move so as to enable the driven component to detach from the string reel, the elastic component being squeezed, the string reel rotating to release a string, and when the pressing part is released, the driving component and the driven component being reset under an action of the elastic component;

Wherein, a sealing ring is sleeved on an outer wall surface of the pressing part and clamped between the housing and the extruding part, and when the trimmer head is running, the extruding part is configured to abut against the inner wall surface of the housing under an action of a centrifugal force and squeeze the sealing ring in different directions with the housing.

2. The trimmer head according to claim 1, wherein, a positioning groove is arranged at one end of the driven component away from the driving component, a first end of the elastic component is fixed in the positioning groove, a second end of the elastic component is configured to abut against the housing, and the elastic component is capable of being elastically deformed along with a movement of the driven component.

3. The trimmer head according to claim 1, wherein, a center of gravity of the driven component is configured to be at one end away from the driving component, when the trimmer head is running, the driven component is configured to slide toward a side away from the driving component under the action of centrifugal force and squeeze the elastic component to disengage from the string reel, then the string reel is rotated to release the string, and when the centrifugal force weakens, the driven component is capable of being reset under the elastic action of the elastic component.

4. The trimmer head according to claim 1, wherein, a pushing groove is further formed at one end of the driven component facing the driving component, the pushing part is accommodated in the pushing groove, and a length of the pushing groove is greater than a length of the pushing part.

5. The trimmer head according to claim 4, wherein, the pushing part comprises a U-shaped pushing plate and a pushing post fixed in the pushing plate, the pushing plate is accommodated in the pushing groove.

6. The trimmer head according to claim 5, wherein, the control assembly further comprises a reset spring, a first end of the reset spring is sleeved on the pushing post, and a second end of the reset spring abuts against the housing.

7. The trimmer head according to claim 5, wherein, a sliding groove is arranged on the inner wall surface of the housing, the pushing post is partially accommodated in the sliding groove, and when the pressing part is pressed, the pushing plate and the pushing post are capable of pushing the driven component to move along the pushing groove and the sliding groove respectively.

8. The trimmer head according to claim 6, wherein, a mounting groove is arranged at a center of the string reel, a through hole is arranged on the driven component, a positioning post protruding toward the string reel is arranged inside the housing, the positioning post passes through the through hole and is fixedly accommodated in the mounting groove, the pushing post is configured to extend toward the positioning post, the first end of the reset spring is sleeved on the pushing post, and the second end of the reset spring abuts against the positioning post.

9. The trimmer head according to claim 1, wherein, the housing comprises a first housing and a second housing assembled with each other, the assembly cavity is enclosed with the first housing and the second housing, a limiting groove is arranged on a side of the first housing facing the second housing, the passing hole is opened on the first housing and communicated with the limiting groove, and the control assembly is movably accommodated in the limiting groove.

10. The trimmer head according to claim 9, wherein, clamping arms are respectively arranged on two opposite inner side walls of the limiting groove, extending parts are arranged on two sides of the driven component, each of the extending parts is limitedly accommodated between the corresponding clamping arm and an inner wall surface of the first housing to fix the control assembly in the limiting groove.

11. The trimmer head according to claim 9, wherein, a supporting deck is arranged on a side of the string reel facing the first housing, a first positioning ratchet gear integrally formed with the string reel and a second positioning ratchet gear concentrically arranged on a circumferential outside of the first positioning ratchet gear are arranged in the supporting deck, the driven component is provided with a first block and a second block protruding toward the string reel, and both the first block and the second block are capable of being meshed with the first positioning ratchet gear and the second positioning ratchet gear.

12. The trimmer head according to claim 11, wherein, the first block and the second block are oppositely arranged on two sides of the driven component, the first block is closer to the driving component than the second block, in an initial state, the first block and the second positioning ratchet gear are clamped with each other, the second block and the first positioning ratchet gear are clamped with each other to limit the string reel to rotate; when the driving component is pressed, the driven component moves, the first block disengages from the second positioning ratchet gear until the first block is clamped with the first positioning ratchet gear, and the second block disengages from the first positioning ratchet gear until the second block is clamped with the second positioning ratchet gear.

13. The trimmer head according to claim 1, wherein, the housing is further provided with a string outlet, and the string outlet is arranged at an oblique angle to the string reel.

* * * * *